(12) United States Patent
Ehrne et al.

(10) Patent No.: US 9,976,655 B2
(45) Date of Patent: May 22, 2018

(54) VALVE

(71) Applicant: VAT Holding AG, Haag (CH)

(72) Inventors: Florian Ehrne, Frumsen (CH);
Christof Bachmann, Sennwald (CH);
Matthias Wozasek, Fussach (AT)

(73) Assignee: VAT Holding AG, Haag (CH)

( * ) Notice: Subject to any disclaimer, the term of this patent is extended or adjusted under 35 U.S.C. 154(b) by 0 days. days.

(21) Appl. No.: 14/694,031

(22) Filed: Apr. 23, 2015

(65) Prior Publication Data

US 2015/0308584 A1 Oct. 29, 2015

(30) Foreign Application Priority Data

Apr. 25, 2014 (AT) .................................. A 297/2014

(51) Int. Cl.
*F16K 3/18* (2006.01)
*F16K 51/02* (2006.01)
*F16K 31/122* (2006.01)

(52) U.S. Cl.
CPC .............. *F16K 3/182* (2013.01); *F16K 3/184* (2013.01); *F16K 51/02* (2013.01); *F16K 31/1225* (2013.01)

(58) Field of Classification Search
CPC .... F16K 31/1225; F16K 31/122; F16K 51/02; F16K 3/16; F16K 3/18; F16K 3/182; F16K 3/188
USPC .......................... 251/193, 197, 199, 158, 175
See application file for complete search history.

(56) References Cited

U.S. PATENT DOCUMENTS

| 1,987,189 | A | * | 1/1935 | Geyer | ...................... F16F 1/30 |
| | | | | | 267/53 |
| 2,476,711 | A | * | 7/1949 | Edwards | ................. F16K 3/188 |
| | | | | | 251/175 |
| 2,858,096 | A | * | 10/1958 | Warren | .................... F16K 3/188 |
| | | | | | 251/175 |

(Continued)

FOREIGN PATENT DOCUMENTS

| DE | 102008049353 | 4/2010 |
| FR | 2283375 | 3/1976 |
| JP | H02138577 | 5/1990 |

OTHER PUBLICATIONS

VAT "Transfer Valve/Insert L-Motion Series 04.3/05.3 for Corrosive Semiconductor Processes and Loadlock Applications", four pages, admitted prior art—Jan. 1, 2013.

*Primary Examiner* — Kevin Murphy
*Assistant Examiner* — David Colon Morales
(74) *Attorney, Agent, or Firm* — Volpe and Koenig, P.C.

(57) ABSTRACT

A valve with an opening surrounded by a seat, and a closure member, which, in a closed position, presses onto the seat and closes the opening and, in an intermediate position, is raised from the seat and overlaps with the opening and, in a maximum opening position, at least partially releases the opening. The valve has a first valve drive for moving the closure member between the maximum opening position and the intermediate position along a first movement track, and a second valve drive for moving the closure member between the intermediate position and the closed position along a second movement track which is at an angle to the first movement track. The valve has at least one transmission part which is provided for reversible deformation by the second valve drive, and the first valve drive acts on the closure member with the interposition of the transmission part.

2 Claims, 4 Drawing Sheets

(56) References Cited

U.S. PATENT DOCUMENTS

| | | | | |
|---|---|---|---|---|
| 3,524,467 | A * | 8/1970 | Worley | F16K 3/188 137/340 |
| 3,931,953 | A * | 1/1976 | Allen | F16K 31/122 251/175 |
| 4,022,449 | A * | 5/1977 | Estorff | F16F 1/18 267/48 |
| 4,039,141 | A * | 8/1977 | Lindsey | H01R 4/64 174/55 G |
| 4,062,515 | A * | 12/1977 | Bobo | F16K 3/10 251/167 |
| 4,381,100 | A * | 4/1983 | Schoenberg | F16K 3/188 137/554 |
| 4,408,634 | A * | 10/1983 | Peacock | F16K 3/184 137/630.12 |
| 4,477,052 | A * | 10/1984 | Knoblauch | F16K 3/0254 251/57 |
| 4,560,141 | A * | 12/1985 | Bosch | F16K 3/182 251/167 |
| 4,957,018 | A * | 9/1990 | Jakubiec | F16K 3/182 251/297 |
| 5,026,995 | A * | 6/1991 | Hazaki | H01J 37/18 250/442.11 |
| 5,087,017 | A * | 2/1992 | Sawa | F16K 51/00 251/175 |
| 5,269,491 | A * | 12/1993 | Reynolds | F16K 51/02 251/169 |
| 5,379,983 | A * | 1/1995 | Geiser | F16K 3/316 251/167 |
| 5,566,922 | A * | 10/1996 | Tanaka | F16K 3/188 251/157 |
| 5,641,149 | A * | 6/1997 | Ito | F16K 3/18 251/158 |
| 5,755,255 | A * | 5/1998 | Iwabuchi | F16K 3/184 137/341 |
| 5,769,952 | A * | 6/1998 | Komino | C23C 16/4404 118/719 |
| 5,881,998 | A * | 3/1999 | Brenes | F15B 15/16 251/204 |
| 5,975,492 | A * | 11/1999 | Brenes | F16K 3/0254 251/175 |
| 6,056,266 | A * | 5/2000 | Blecha | F16K 3/0218 251/158 |
| 6,056,267 | A * | 5/2000 | Schneider | F16K 3/184 251/193 |
| 6,095,741 | A * | 8/2000 | Kroeker | F16K 3/18 251/193 |
| 6,390,448 | B1 * | 5/2002 | Kroeker | F16K 3/188 251/167 |
| 6,416,037 | B1 * | 7/2002 | Geiser | F16K 3/18 251/158 |
| 6,425,569 | B1 * | 7/2002 | Ito | F16K 51/02 251/158 |
| 6,431,518 | B1 * | 8/2002 | Geiser | F16K 51/02 251/158 |
| 6,471,181 | B2 * | 10/2002 | Duelli | F16K 3/18 251/193 |
| 6,612,546 | B2 * | 9/2003 | Young | F16K 3/184 251/158 |
| 6,854,708 | B2 * | 2/2005 | Contin | F16K 51/02 251/167 |
| 6,913,243 | B1 * | 7/2005 | Tomasch | F16K 3/18 251/167 |
| 6,966,538 | B2 * | 11/2005 | Hayashi | F16K 3/16 251/187 |
| 7,004,453 | B1 * | 2/2006 | Cheng | F16K 3/06 251/167 |
| 7,086,638 | B2 * | 8/2006 | Kurita | F16K 3/188 251/175 |
| 7,413,162 | B2 * | 8/2008 | Geiser | F16K 3/10 251/175 |
| 7,422,653 | B2 * | 9/2008 | Blahnik | H01L 21/67126 118/719 |
| 7,494,107 | B2 * | 2/2009 | Sheydayi | F16K 51/02 251/175 |
| 7,520,517 | B2 * | 4/2009 | Svendsen | B60G 11/04 267/260 |
| 7,611,122 | B2 * | 11/2009 | Tichy | F16K 3/18 251/158 |
| 7,731,156 | B2 * | 6/2010 | Duelli | G05D 16/0613 251/167 |
| 7,762,527 | B2 * | 7/2010 | Schoen | F16K 3/18 251/175 |
| 7,871,061 | B1 * | 1/2011 | Mandeville, Jr. | F16K 3/04 251/169 |
| 8,002,238 | B2 * | 8/2011 | Gantner | F16K 3/182 251/193 |
| 8,177,190 | B2 * | 5/2012 | Maerk | F16K 3/0218 251/158 |
| 8,376,326 | B2 * | 2/2013 | Basin | B60G 11/02 24/569 |
| 8,672,293 | B2 | 3/2014 | Ehrne et al. | |
| 2006/0124886 | A1 * | 6/2006 | Brenes | F16K 3/188 251/326 |
| 2010/0300920 | A1 * | 12/2010 | Wagner | F16K 51/02 206/524.8 |
| 2011/0095218 | A1 * | 4/2011 | Schoch | F16K 51/02 251/157 |
| 2011/0108750 | A1 * | 5/2011 | Ehrne | F16K 3/314 251/319 |
| 2011/0175011 | A1 * | 7/2011 | Ehrne | F16K 3/182 251/366 |
| 2012/0247564 | A1 * | 10/2012 | Kho | F16K 3/188 137/1 |
| 2012/0285094 | A1 * | 11/2012 | Kim | H01L 21/67126 49/358 |
| 2012/0298899 | A1 * | 11/2012 | Geiser | F16K 51/02 251/158 |
| 2012/0298904 | A1 * | 11/2012 | Geiser | F16K 3/14 251/359 |

* cited by examiner

VALVE

INCORPORATION BY REFERENCE

The following documents are incorporated herein by reference as if fully set forth: Austrian Patent Application A297/2014, filed Apr. 25, 2014.

BACKGROUND

The present invention relates to a valve, in particular vacuum valve, with an opening surrounded by a valve seat, and a closure member, wherein, in a closed position, the closure member is pressed onto the valve seat and closes the opening and, in an intermediate position, is raised from the valve seat and is arranged overlapping the opening and, in a maximum opening position, entirely or at least partially releases the opening, wherein the valve has at least one first valve drive for moving the closure member to and/or fro between the maximum opening position and the intermediate position along a first movement track, and at least one second valve drive for moving the closure member to and/or fro between the intermediate position and the closed position along a second movement track, and the first movement track and the second movement track are arranged in an angled manner with respect to each other.

Such valves are basically known in the prior art. They are frequently used in vacuum technology and are also referred to as "L valves or J valves". The more or less L- or J-shaped movement of the closure member from the maximum opening position into the closed position and vice versa is implemented with the effect of long-term durability of the seal attached either to the valve seat or to the closure member in order to keep shearing movements at the seal as small as possible or to eliminate same.

DE 10 2008 049 353 A1 shows such valves in various embodiments. In the exemplary embodiments of this document, the first valve drive for moving the closure member between the maximum opening position and the intermediate position is designed in the form of a piston-cylinder arrangement and is mounted in a "guide unit". During the movement of the closure member from the intermediate position into the closed position and vice versa, this guide unit is moved at the same time. This therefore means that the first valve drive is also always moved to and fro during this movement. The exemplary embodiments of this prior art differ from one another only in the manner of the second valve drive for moving the closure member between the intermediate position and the closed position. The first exemplary embodiment of the document is a piston-cylinder arrangement which operates counter to a spring loading. In another exemplary embodiment of this document, a lever solution is realized as the second valve drive.

Furthermore, valves of the type in question and which are provided under the designation transfer valve/insert L-motion series 04.3/05.3 are known in the prior art. In the case of this valve, cylinders of the first and second valve drive are integrated in a housing of the valve. In this prior art, the connection of the vertical and horizontal stroke, i.e. movement along the first and second movement tracks, takes place by means of a bolt which is attached and mounted at right angles on the cylinder of the first valve drive and on which a yoke slides during the movement along the second movement track or during the horizontal movement.

SUMMARY

It is the object of the invention to provide an alternative concept for a valve of the type in question for the interaction of first and second valve drive.

For this purpose, it is provided according to the invention that the valve has at least one transmission part which is provided for reversible deformation by means of the second valve drive, and the first valve drive acts on the closure member with the interposition of the transmission part.

It is therefore a fundamental concept to deform the transmission part reversibly in a specific manner by means of the second valve drive. The transmission part here can be of single- or multi-part design or of integral design. The term of deformability or deformation should be interpreted broadly here. It generally involves a specifically provided possibility for changing the shape of the transmission part. This may be, but does not have to be, brought about by bending, as is also explained in detail further below. These more detailed explanations following further below especially also reveal that there are various possibilities as to how this concept according to the invention of a specifically reversible deformation of the transmission part is realized by means of the second valve drive.

A closure member is preferably a valve disk, i.e. in particular a closure member of planar design. In preferred variant embodiments, the openings to be closed by means of the closure member have cross-sectional areas of 40 $cm^2$ to 1000 $cm^2$, preferably of 60 $cm^2$ to 500 $cm^2$. The valves according to the invention could also be referred to as a closure device.

As is known per se, at least one or else in each case one seal can be arranged either on the closure member or on the valve seat. The first movement track and/or also the second movement track are arranged in an angled manner with respect to each other. The movement tracks can, but do not have to, run linearly. However, in particular the first movement track is preferably of linear design. In an angled manner means that they enclose an angle and are not parallel. The first and the second movement track preferably enclose an at least approximately orthogonal angle with each other. The movement tracks could also be referred to as movement paths. They indicate the route of movement of the closure member. The respective movement track can be plotted by, for example, following the route of a previously fixed point on the closure member during the movement of the closure member. Each movement track comprises two directions which are opposed to each other, lie on each other or are arranged coaxially with respect to each other.

The closure member is preferably fastened to a valve rod. In particularly preferred embodiments of the invention, the closure member is fastened to the valve rod, and the first valve drive acts on the valve rod with the interposition of the transmission part. It should also be mentioned in this connection that valves according to the invention can not only have a first valve drive for moving along the first movement track and a second valve drive for moving along the second movement track. On the contrary, it can also be provided that two or more first valve drives are realized for moving the closure member to and/or fro along the first movement track and/or two or more valve drives are realized for moving the closure member to and/or fro along the second movement track. In these embodiments, the first valve drives can act, with the interposition of optionally a plurality of transmission parts, wherein each valve drive is preferably assigned a dedicated transmission part, on a yoke which is connected, preferably rigidly, to the valve rod, wherein the closure member is fastened in turn to the valve rod.

The intermediate position is shown once again in detail further below with reference to the exemplary embodiments. It is the position in which, although the closure member has been raised from the valve seat, said closure member still otherwise covers said valve seat, i.e. overlaps with the opening. In contrast thereto, it is provided in the opening position that the closure member entirely or partially releases the opening, i.e. no longer covers the latter, and therefore fluids and/or especially, however, components to be machined or processed can be guided through the opening.

Within the context of embodiments of the invention that are low in wear as permanently as possible and in particular do not load seals which are optionally present, it is provided, in preferred variants, that in the closed position, the closure member takes up a position which is a parallel displacement of the position of the closure member in the intermediate position. A parallel displacement should be understood here in the mathematical sense to the effect that each point of the closure member is displaced by the same distance in the same direction or in directions parallel to one another. A translation can also be referred to in this context. In this context, in particularly preferred variants of the invention, the transmission part permits a parallel displacement of the closure member during the movement thereof between the intermediate position and the closed position. It should be pointed out that the second movement track does not have to run linearly for this purpose. The parallel displacement mentioned can also result merely from comparison of the end positions, i.e. the intermediate position and the closed position. In particular within the context of the parallel displacement mentioned, it can be provided, for example, that the transmission part has or consists of at least one longitudinally extended bending region. In these embodiments, the transmission part can be designed as a leaf spring in its entirety or else only in regions. The leaf spring then forms the longitudinally extended bending region. In this context, the longitudinal extent of the bending region first of all means only that a punctiform bending region is not involved. A longitudinally extended bending region can be of bar-shape design that can also involve a bending region extended in a planar manner. The latter is also extended longitudinally in this context. However, a common feature of these exemplary embodiments is that the deformation of the transmission part takes place along the entire longitudinally extended bending region or at least a large part of same.

As an alternative thereto, the reversible deformation of the transmission part can also be achieved by the transmission part having at least two joints which are connected to one another by means of at least one intermediate web, wherein each of said joints permits pivoting about at least one axis. In these variants, it can be provided that the movement for reversible deformation of the transmission part takes place exclusively by pivoting in the joints. Single-axle joints but equally well multi-axle joints or else ball and socket joints can be involved here. Of course, the variants referred to can also be combined with one another, for example, by the intermediate web between the joints being formed as a longitudinally extended bending region. Furthermore, a multiplicity of various other mixed forms are also conceivable, and a transmission part can also have a longitudinally extended bending region, for example, also outside the region of the joints and the intermediate web. The bending regions can be bent about an imaginary axis lying orthogonally with respect to the longitudinal extent thereof or else can be subjected to torsion about the longitudinal extent thereof.

In preferred variants of the invention, the transmission part is of substantially stiff design when acted upon in the direction parallel to the first movement track and can be of softer design in order to permit the reversible deformation when acted upon in the direction parallel to the second movement track. Within this context, preferred variants of the invention make provision for the transmission part to be designed to be stiffer in the direction parallel to the first movement track than in the direction parallel to the second movement track. This should be understood in such a manner that the transmission part is stiffer when the transmission part is acted upon by a force in the direction parallel to the first movement track than when the transmission part is acted upon in the direction parallel to the second movement track. The effect which can be achieved by this is that the transmission part transmits the movement of the first valve drive between the maximum opening position and the intermediate position, i.e. along the first movement track, at least substantially without deformation and is reversibly deformed in a specific manner by means of the second valve drive during the movement of the closure member between the intermediate position and the closed position, i.e. along the second movement track.

Starting from the definition that, in the case of a longitudinally extended bending region, the length is greater than the width and the width is greater than the thickness of the bending region, these desired different rigidities can be achieved by the width of the bending region being at least twice the thickness of the bending region, preferably at least ten times the thickness of the bending region. In particularly preferred variants, the transmission part is of U-shaped or L-shape design.

In particularly preferred variants of the invention, it is provided that the transmission part has at least one switching element for switching a switch for activating the first and/or the second valve drive or is connected to this switching element. This can be used, for example, in order to deactivate the first valve drive at the end of the movement of the closure member along the first movement track in the direction of the intermediate position and to activate the second valve drive in order subsequently to bring the closure member along the second movement track into the closed position, or vice versa. The switching element can be integrally formed on the transmission part. However, a multi-part embodiment is also conceivable, in which the switching element is fastened to the transmission part in another manner, for example by screwing on, soldering on, clamping or the like. It is favorable at any rate if the switching element is fastened to the transmission part at least so as to move with the transmission part parallel to the first movement track.

Very different drive forms can be used as the first valve drive and/or as the second valve drive. Hydraulic, pneumatic, electric, electromagnetic drives or other drives known in the prior art, in particular linear drives, can be involved. However, pneumatic or electric drives are preferably used in vacuum technology. In preferred variants in this context, the first valve drive and/or the second valve drive, preferably in each case, has or have a piston-cylinder arrangement, wherein at least one valve drive part of the, preferably respective, valve drive is a cylinder and at least one other valve drive part of the, preferably respective, valve drive is a piston which is guided movably in the cylinder. Double-action piston-cylinder arrangements which are suitable for moving the closure member both in the one direction along the movement track and in the opposed direction along the movement track can be involved. However, piston-cylinder arrangements acting in a single manner in only one direction of the movement track can also be used. The other direction of movement can then be realized, for example, via springs, electrically or via other suitable drives. For example, the restoring springs 32 shown in FIGS. 4, 8 and 12 of DE 10 2008 049 353 A1 are mentioned here as an example. In the case of the valve drive parts fixed on the housing, piston and cylinder arrangements can involve both the pistons and the cylinders. Within the context of the invention, it is provided, in particularly preferred embodiments in this connection, that the first valve drive and the second valve drive in each case have at least two valve drive parts which are movable relative to one another, wherein the transmission part is arranged and/or acts between valve drive parts of the valve drives that are movable in each case relative to a valve housing of the valve.

As already indicated at the beginning, valves according to the invention are particularly preferably used in vacuum technology, for example, in order to close process chambers in which electronic components or the like are machined or produced. In this connection, vacuum technology is referred to in particular when operating states with pressures of less than or equal to 0.001 mbar or 0.1 Pascal are achieved. Vacuum valves are valves which are configured for these pressure ranges and corresponding differential pressures with respect to the environment. Vacuum valves then generally have what is referred to as a vacuum region in which process states having these negative pressures are reached. In preferred embodiments of such valves or vacuum valves, the first and the second valve drive or the first and the second valve drives are preferably located outside the vacuum region. In order to delimit and seal the vacuum region from the region outside the vacuum region, bellows lead-throughs, linear lead-throughs and the like, for example for the valve rod, are known in the prior art.

BRIEF DESCRIPTION OF THE DRAWINGS

Variant embodiments of the invention are illustrated by way of example in the figures, in which.

DETAILED DESCRIPTION OF THE PREFERRED EMBODIMENTS

The valve 1 of the first exemplary embodiment is a "vacuum valve" which can be used in vacuum technology in order to close openings in process chambers, through which the work pieces to be machined are introduced into the process chamber and/or are removed therefrom, in a pressure-resistant and/or gas-tight manner. In the exemplary embodiments shown here, the closure member 4 is a valve disk. The opening 3 to be closed in the valve 1 is designed here to be approximately rectangular with rounded corners. The opening 3 is surrounded by the valve seat 2 of the valve 1. The valve seat 2 here is part of the valve housing 20. However, this does not have to be so and the valve seat 2 can in principle also be formed on a separate component. In the exemplary embodiment shown, the seal 26 is located on the closure member 4. This also does not necessarily have to be so, and a seal 26 can equally readily be arranged on the valve seat 2 or both on the valve seat 2 and on the closure member 4.

Figure 1:
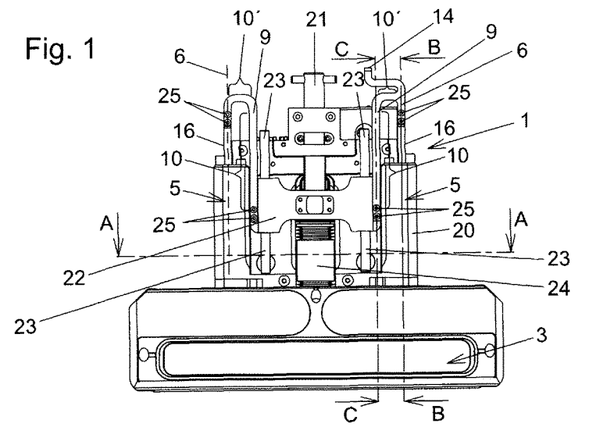
FIGS. 1 to 5 show illustrations in which the closure member of the valve of the first exemplary embodiment is in the maximum opening position.
Figure 2:
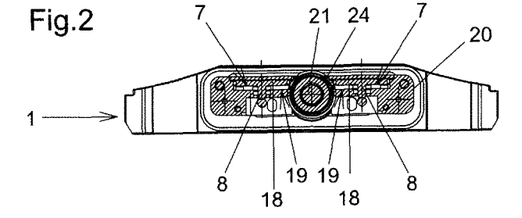
Figure 3:
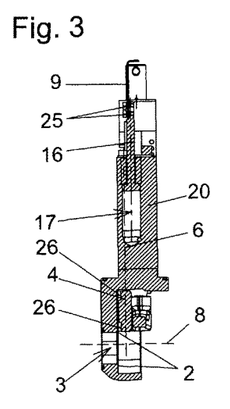
Figure 4:
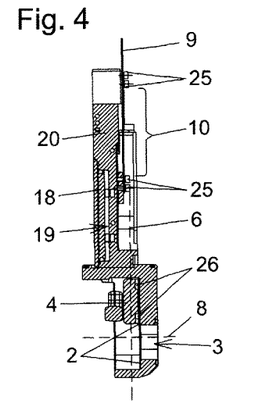
Figure 5:
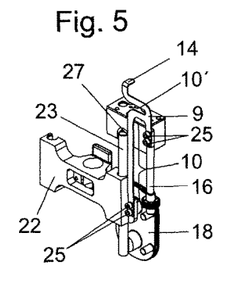

FIGS. 1 to 5 illustrate this first exemplary embodiment according to the invention of the valve 1 in the maximum opening position of the closure member 4. In the exemplary embodiment shown, the closure member 4 completely releases the opening 3 in said maximum opening position. This can be particularly readily seen in FIGS. 3 and 4. FIG. 1 shows a frontal view of the valve 1, FIG. 2 shows the horizontal section along the intersecting line AA, FIG. 3 shows the vertical section along the intersecting line BB, FIG. 4 shows the vertical section along the intersecting line CC. FIG. 5 is an illustration in which numerous parts of the valve 1 have been omitted in order to be able better to illustrate one of the transmission parts 9 and the connection thereof.

Figure 6:
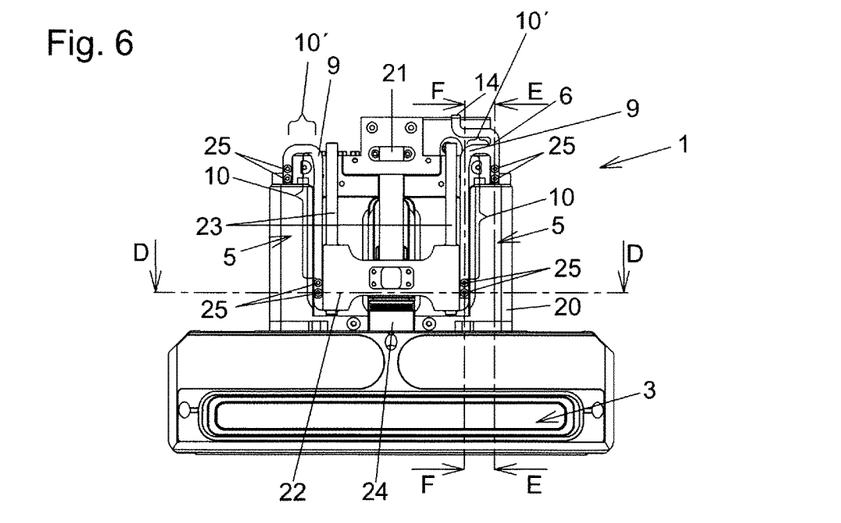
FIGS. 6 to 10 show illustrations in which the closure member of the valve of the first exemplary embodiment is in the intermediate position.
Figure 7:
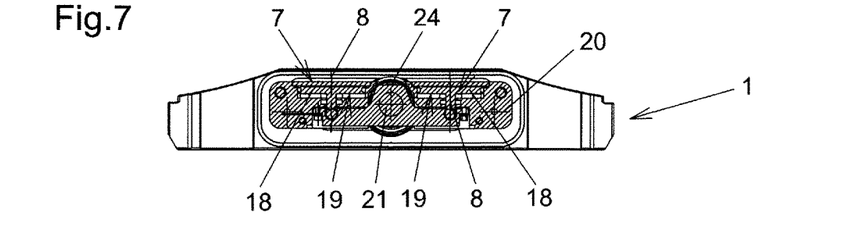
Figure 8:
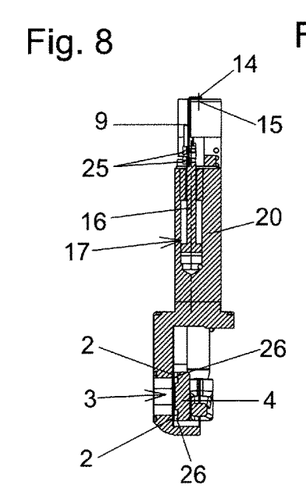
Figure 9:
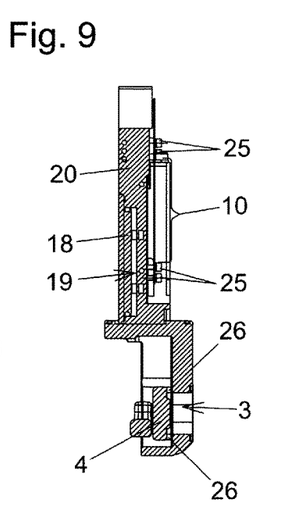
Figure 10:
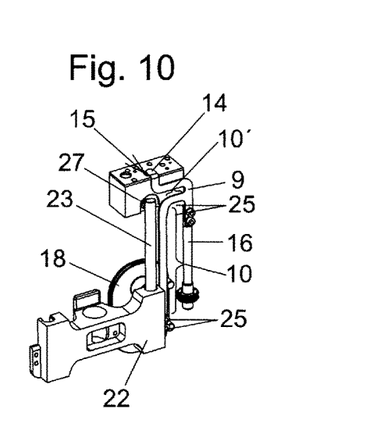

FIGS. 6 to 10 show the situation when the closure member 4 is in the intermediate position. In the latter, the closure member 4 is raised from the valve seat 2 and brought to overlap with the opening 3, but is still not yet pressed onto the valve seat 2. This position can be seen particularly readily in FIGS. 8 and 9. The movement of the closure member 4 between the maximum opening position according to FIGS. 1 to 5 into the intermediate position according to FIGS. 6 to 10 and back takes place along the first movement track 6 by means of the first valve drive 5. In the exemplary embodiment shown, this is a pure vertical stroke. The movement track 6 and parallels thereto, which are also denoted by the reference number 6 for the sake of simplicity, are shown. FIG. 6 shows a frontal view as FIG. 1, FIG. 7 shows the section along the intersecting line DD, FIG. 8 shows the section along the intersecting line EE, and FIG. 9 shows the section along the intersecting line FF in FIG. 6. FIG. 10 shows a similar illustration as FIG. 5, but wherein, as stated, the closure member 4 is in the intermediate position.

Figure 11:
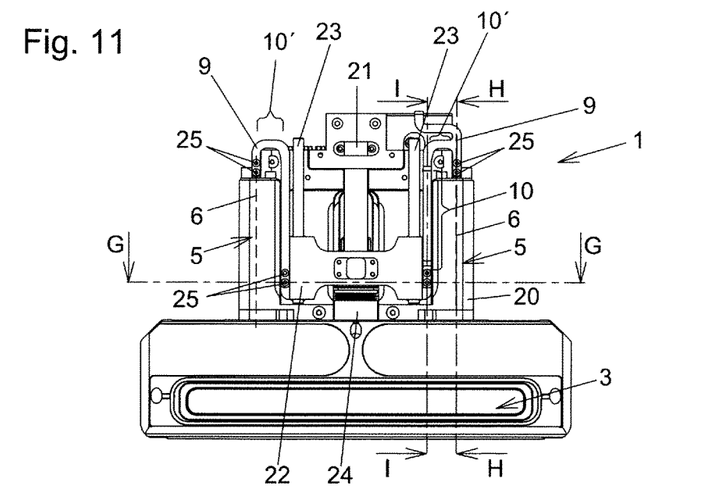
FIGS. 11 to 15 show illustrations in which the closure member of the valve of this first exemplary embodiment is in the closed position.
Figure 12:
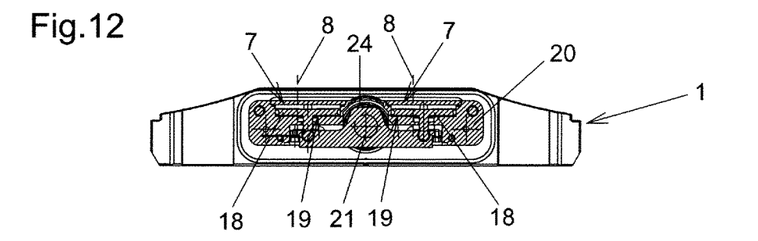
Figure 13:
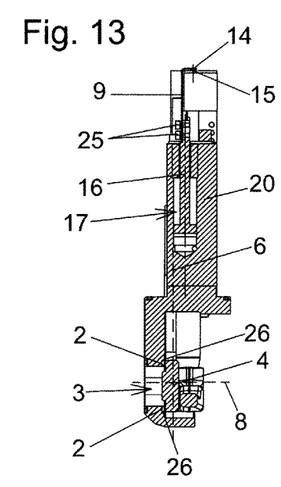
Figure 14:
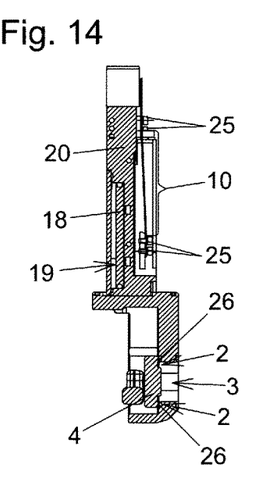
Figure 15:
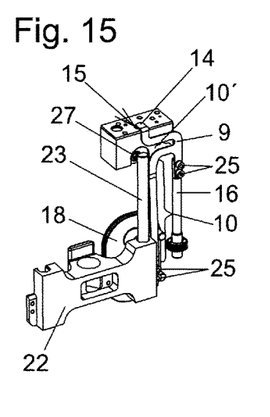

FIGS. 11 to 15 show illustrations of the closed position. In the latter, the closure member 4 closes the opening 3 by the closure member 4 being pressed here with the seal 26 thereof against the valve seat 2. In this closed position, the opening 3 is closed, preferably in a gas-tight manner, by means of the closure member 4 for the designated pressure ranges. The movement of the closure member 4 between the intermediate position according to FIGS. 6 to 10 and the closed position according to FIGS. 11 to 15 takes place along the second movement track 8 by means of the second valve drive 7. The movement track 8 and parallels thereto, which are also referred to by the reference number 8 for the sake of simplicity, are shown. FIG. 11 in turn shows a frontal view, FIG. 12 shows the section along the intersecting line GG, FIG. 13 shows the section along the intersecting line HH and FIG. 14 shows the section along the intersecting line II. FIG. 15 shows an illustration, which is analogous to FIGS. 5 and 10, in this situation.

The second movement track 8 can also not run exactly linearly because of the reversible deformation of the transmission part 9 during the movement of the closure member 4 between the intermediate position and the closed position.

However, in preferred embodiments, as shown here, it is preferably provided that the first movement track 6 and a tangent to the second movement track 8 are arranged orthogonally with respect to each other at the transition from the first movement track 6 to the second movement track 8.

In the exemplary embodiment shown according to FIGS. 1 to 15, two first valve drives 5 are provided for moving the closure member 4 along the first movement track 6. In this exemplary embodiment, said valve drives are in each case designed here as double-action piston-cylinder arrangements, as can be seen particularly readily in the sectional illustrations of FIGS. 3, 8 and 13. By means of corresponding action upon the cylinder spaces of the cylinders 17 of the first valve drives 5, the pistons 16 can be moved in both directions along or parallel to the first movement track 6, as a result of which the closure member 4 can be moved to and fro between the maximum opening position and the intermediate position. In the exemplary embodiment shown, the valve drive parts 17 in the form of the cylinders are arranged fixed with respect to the valve housing 20 of the valve 1. In FIGS. 3, 8 and 13, this can readily be seen by way of the integral design of the cylinder 17 in the valve housing 20. The movable valve drive parts 16 in each case form the pistons. Strictly speaking, in the exemplary embodiments shown here, the valve drive parts 16 are in each case formed from a piston and the piston rod fastened thereto. However, in a simplification, the unit consisting of a piston and a piston rod fastened thereto is referred to as the piston. Of course, the design realized here could also be constructed a different way around by the valve drive parts 16 in the form of the pistons being designed in a fixed manner with respect to the valve housing 20 and the valve drive parts 17 in the form of the cylinders being moved relative thereto.

The second valve drive 7 is also present here in double or twin form. Piston-cylinder arrangements in which one valve drive part 18 in each case forms a piston and the other valve drive part 19 forms a cylinder are again involved. The valve drive parts 19 in the form of the cylinders are also formed here in a fixed manner with respect to the valve housing 20. The valve drive parts 18 in the form of the pistons of the second valve drives 7 are in each case connected fixedly to guide rods 23 on which a yoke 22 is mounted displaceably. The valve rod 21 which is sealed with respect to the valve housing 20 by means of the bellows lead-through 24 is fastened to the yoke 22. A separation between the "vacuum region" in the region of the opening 3 and the region which is located outside the vacuum region and in which, in the exemplary embodiment shown, for example, both the first valve drives 5 and the second valve drives 7 are located, also takes place by this means. The closure member 4 is fastened to the valve rod 21.

In the first exemplary embodiment of the invention, the valve 1 has two transmission parts 9 according to the invention which are provided for reversible deformation by means of the second valve drives 7, wherein the first valve drive 5 in each case acts on the closure member 4 with the interconnection of a transmission part 9. In the first exemplary embodiment, the transmission parts 9 are of U-shaped or L-shaped design at least in regions or at least have such regions, as can be seen particularly readily in FIGS. 1, 6 and 11. The right transmission part 9 has a switching element 14 for switching a switch 15 for activating the first and/or the second valve drive 5, 7. In the exemplary embodiment shown, the switching element 14 is formed integrally on said transmission part 9. In the variant illustrated, the transmission part 9 connects the valve drive parts 16 or pistons of the first valve drives 5 in each case to the yoke 22. The fastening points of the transmission parts 9 to said components are in each case provided with the reference number 25. In the exemplary embodiment shown, the first valve drive 5 therefore acts on the closure member 4 in each case with the interconnection of a transmission part 9, of the yoke 22 and of the valve rod 21. In other embodiments, the interconnection of more or fewer components is also conceivable. It would also be possible, for example, for the transmission parts 9 to be fastened directly to the closure member 4 or directly to the valve rod 21.

In the first exemplary embodiment, each of the transmission parts 9 has a bending region 10 which is provided for reversible deformation by means of the respective second valve drive 7. This longitudinally extended bending regions 10 can be designed, for example, in the form of a leaf spring. In the exemplary embodiment shown, the entire transmission part 9 in each case consists of a leaf spring. For simple connection both to the pistons or valve drive parts 16 and to the yoke 22, the transmission parts 9 are advantageously of L- or U-shaped design in regions, as shown here. In the variant shown, a second bending region 10' is also in each case produced on the transmission part 9. A torsional deformation can take place in said bending region 10'. By contrast, the bending regions 10 are deflected in the manner which can readily be seen by way of the comparison between FIG. 9, in which the intermediate position is illustrated, and FIG. 14, in which the closed position is illustrated. Of course, numerous modification possibilities are provided for the variant shown, and so the transmission part 9 could, of course, also be of stiff design in regions to the effect that there is either only the bending region 10 or only the bending region 10'. Furthermore, of course, numerous other possibilities for the design of longitudinally extended bending regions 10 and/or 10' on the transmission part 9 are also conceivable.

In order firstly to be able to transmit the movement of the first valve drives 5 along the first movement track 6 as a more or less rigid element to the closure member 4 and secondly to permit the reversible deformation by means of the second valve drive 7, the transmission part 9 is designed to be stiffer in the direction parallel to the first movement track 6 than in the direction parallel to the second movement track 8. In the exemplary embodiment shown, this is achieved by the width of the transmission part 9, which is designed in the manner of a leaf spring, of this exemplary embodiment being significantly greater than the thickness of the transmission part 9.

A closing operation, starting from the maximum opening position according to FIGS. 1 to 5 via the intermediate position according to FIGS. 6 to 10 to the closed position according to FIGS. 11 to 15 is now explained by way of example below.

Starting from the maximum opening position, the chambers of the valve drive parts 17, which are designed as cylinders, of the first valve drives 5 are acted upon in such a manner that the valve drive parts 16, which are designed as pistons, are lowered. This movement of the valve drive parts 16 or pistons is transmitted via the transmission parts 9 to the yoke 22. The yoke 22 slides downwards along the guide rods 23 and, in the process, carries the piston rod 21 and therefore also the closure member 4 along the first movement track 6 until the intermediate position according to FIGS. 11 to 15 is reached. When the latter is reached, the switching element 14 of the right transmission part 9 strikes against the switch 15. By this means, the second valve drives 7 are switched on in the exemplary embodiment shown.

By this means, in order to move the closure member 4 from the intermediate position into the closed position, the corresponding cylinder chambers of the valve drive parts 19, which are designed as cylinders, of the second valve drives 7 are now acted upon such that the valve drive parts 18, which are designed as pistons, of the second valve drives 7 are moved together with the guide rods 23 and the yoke 22 mounted thereon along the second movement track 8. By this means, the valve rod 21 which is fastened to the yoke 22 is also moved with the closure member 4 along the second movement track 8 in that direction of the valve seat 2, and therefore the closure member 4 which is also raised from the valve seat 2 in the intermediate position is then pressed with the seals 26 thereof in a sealing manner against the valve seat 2 in the closed position. During the movement along the second movement track 8, the transmission part 9 is reversibly deformed by means of the second valve drive 7. In the exemplary embodiment shown, this deformation of the transmission parts 9 is essentially implemented in the bending regions 10, as can readily be seen by way of comparing FIGS. 9 and 14.

The process for opening the valve from the closed position via the intermediate position to the maximum opening position takes place substantially in an analogous manner in a reverse sequence. However, the switch 27 which, in the exemplary embodiment shown, is actuated by the guide rod 23 should also be mentioned in this connection. As long as the closure member 4 is in the maximum opening position or in the intermediate position or in positions in between, the switch 27 is held in the pressed position by the guide rod 23. On the route from the intermediate position into the closed position, the guide rod 23 is raised from the switch 27. During the closing operation, the switch 27 is then pressed again at the end of the movement along the second movement track 8 from the closed position toward the intermediate position when the intermediate position is reached, and therefore the first valve drives 5 are switched on in the exemplary embodiment shown.

In the exemplary embodiment shown here, the first valve drives 5 and the second valve drives 7 are designed as piston-cylinder arrangements which are preferably actuated pneumatically. Of course, a hydraulic actuation is also conceivable. However, it should also be pointed out that the first and the second valve drives 5 and 7 cannot only be designed in each case as double-action piston-cylinder arrangements but also a single-action piston-cylinder arrangement. The opposed stroke can then take place, for example, by means of corresponding springs or other elastic bodies. Of course, alternatively thereto, other drives, such as, for example, electric or electromagnetic drives, in particular linear drives, are also conceivable in order to realize the first and the second valve drives 5 and 7.

Figure 16:
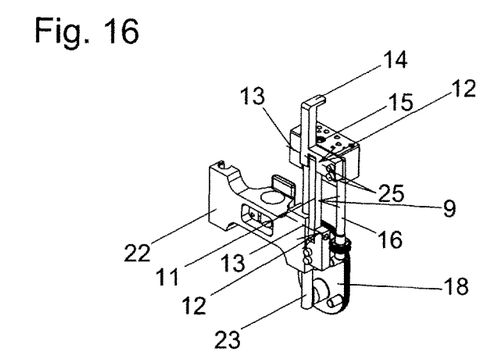
FIG. 16 shows an illustration of an alternative embodiment of the invention.

As already mentioned at the beginning, the reversible deformation of the transmission part 9 does not necessarily have to take place in the form of bending or twisting of a longitudinally extended bending region 10 or 10'. FIG. 16 shows an alternative in this regard in an illustration analogous to FIGS. 5, 10 and 15. The remainder of the valve 1 of this second exemplary embodiment can be designed as explained with regard to the first exemplary embodiment. There is then substantially the same manner of operation which is not explained once again here.

In the second exemplary embodiment according to FIG. 16, the transmission part 9 has two joints 12 which are connected to each other by means of the intermediate web 11. Each of said joints 12 can be pivoted about an axis 13. This exemplary embodiment involves simple joints 12 which are pivotable about a single axis 13. However, ball and socket joints or joints 12 which are pivotable about a plurality of axes can also be used. In this exemplary embodiment, the intermediate web 11 is of rigid design, and therefore the transmission part 9 of this second exemplary embodiment is deformed exclusively by the movement in the joints 12. Of course, in a departure from the two exemplary embodiments shown previously, mixed forms are also conceivable here. For example, the intermediate web 11 could also be designed as a longitudinally extended bending region 10.

Figure 17:
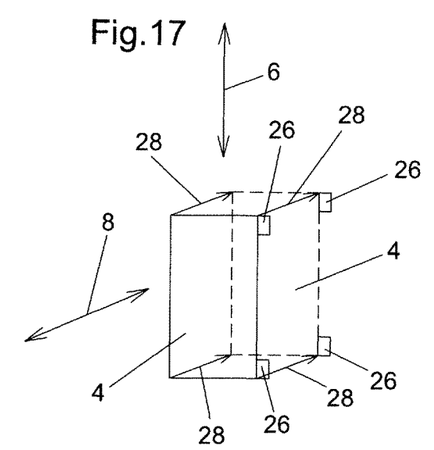
FIG. 17 shows a schematized illustration of the parallel displacement of the closure member.
Figure 18:
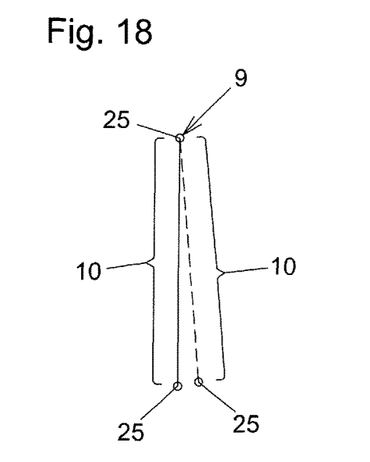
FIG. 18 shows a schematized illustration of the reversible deformation of a longitudinally extended bending region of a transmission part according to the invention.
Figure 19:
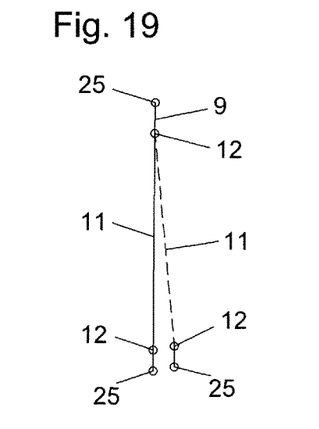
FIG. 19 shows a schematized illustration of the reversible deformation of a transmission part according to the invention with intermediate web and two joints.

A common feature of the two previously shown and discussed variant embodiments of the invention is that, in the closed position, the closure member 4 takes up a position which is a parallel displacement of the position of the closure member 4 in the intermediate position. This parallel displacement of the closure member 4 is illustrated in schematized form in FIG. 17. The rectangle 4 illustrated by continuous lines shows the closure member 4 in the intermediate position according to FIGS. 6 to 10. The closure member 4 illustrated by dashed lines symbolizes the closed position in which the closure member 4 is pressed with the seals 26 thereof against the valve seat 2, which is still not illustrated in FIG. 17. The arrows 28 symbolize the displacement vectors of said parallel displacement. The angle between the second movement track 8 and the first movement track 6 is illustrated in exaggerated form in FIG. 17. The slight raising of the closure member 4 in the direction parallel to the first movement track 6 during the movement of the closure member 4 from the intermediate position into the closed position, i.e. along the second movement track 8, is inevitably produced by the fact that the transmission part 9 retains the length thereof during the reversible deformation thereof by means of the second valve drive 7. FIGS. 18 and 19 are also attached in order to illustrate this at least schematically. FIG. 18 shows the deformation of a longitudinally extended bending region 10 of a transmission part 9. FIG. 19 shows the deformation of the transmission part 9 which, according to FIG. 16, has two joints 12 with an intermediate web 11 located in between. The situation in the intermediate position is in each case illustrated by continuous lines. The deformed state in the closed position of the closure member (not illustrated in FIGS. 18 and 19) is in each case illustrated by dashed lines.

Finally, it is also pointed out once again that, in a departure from the exemplary embodiments shown, there can in each case also be only one first valve drive and/or only one second valve drive or else more than two first and/or second valve drives in other valves according to the invention.

KEY FOR THE REFERENCE NUMBERS

1 Valve
2 Valve seat
3 Opening
4 Closure member
5 First valve drive
6 First movement track
7 Second valve drive
8 Second movement track
9 Transmission part
10,10' Bending region
11 Intermediate web
12 Joint
13 Axis
14 Switching element 15 Switch
16 Valve drive part
17 Valve drive part
18 Valve drive part
19 Valve drive part
20 Valve housing
21 Valve rod
22 Yoke
23 Guide rod
24 Bellows lead-through
25 Fastening point
26 Seal
27 Switch
28 Displacement vector

The invention claimed is:

1. A valve comprising:

an opening surrounded by a valve seat, a closure member that is movable from a closed position, in which the closure member is pressed onto the valve seat and closes the opening, to an intermediate position in which the closure member is raised from the valve seat and is arranged overlapping the opening, and a maximum opening position, the closure member at least partially releases the opening, at least one first valve drive that moves the closure member at least one of to or fro between the maximum opening position and the intermediate position along a first movement track, and at least one second valve drive that moves the closure member at least one of to or fro between the intermediate position and the closed position along a second movement track, and the first movement track and the second movement track are arranged in an angled manner with respect to each other, at least one transmission part which is provided for reversible deformation by the second valve drive, and the first valve drive acts on the closure member with the interposition of the transmission part, the at least one first valve drive acts, with the interposition of the at least one transmission part, on a yoke which is connected to a valve rod, and the closure member is fastened to the valve rod.

2. The according to claim 1, wherein the yoke is mounted displaceably on at least one guide rod connected to the at least one second valve drive.

* * * * *

UNITED STATES PATENT AND TRADEMARK OFFICE
CERTIFICATE OF CORRECTION

PATENT NO. : 9,976,655 B2  
APPLICATION NO. : 14/694031  
DATED : May 22, 2018  
INVENTOR(S) : Florian Ehrne et al.

Page 1 of 1

It is certified that error appears in the above-identified patent and that said Letters Patent is hereby corrected as shown below:

In the Claims

In Claim 2, at Column 12, Line 20, please insert the word --valve-- after the word "The" and before the word "according."

Signed and Sealed this  
Sixteenth Day of October, 2018

Andrei Iancu  
*Director of the United States Patent and Trademark Office*